(12) United States Patent
Finkelshtain et al.

(10) Patent No.: US 10,450,192 B2
(45) Date of Patent: Oct. 22, 2019

(54) PROCESS FOR THE THERMAL DECOMPOSITION OF AMMONIA AND REACTOR FOR CARRYING OUT SAID PROCESS

(71) Applicant: GENCELL LTD., Petah Tikva (IL)

(72) Inventors: Gennadi Finkelshtain, Modiin (IL); Michael Lerner, Rishon le Zion (IL); Ziya Ramizovich Karichev, Moscow (RU); Leonid Titelman, Petah Tikva (IL)

(73) Assignee: Gencell Ltd., Petah Tikva (IL)

( * ) Notice: Subject to any disclaimer, the term of this patent is extended or adjusted under 35 U.S.C. 154(b) by 0 days.

(21) Appl. No.: 15/746,085

(22) PCT Filed: Jul. 22, 2016

(86) PCT No.: PCT/US2016/043581
§ 371 (c)(1),
(2) Date: Jan. 19, 2018

(87) PCT Pub. No.: WO2017/015569
PCT Pub. Date: Jan. 26, 2017

(65) Prior Publication Data
US 2018/0230006 A1 Aug. 16, 2018

Related U.S. Application Data

(60) Provisional application No. 62/195,516, filed on Jul. 22, 2015.

(51) Int. Cl.
*C01B 3/04* (2006.01)
*B01J 16/00* (2006.01)
(Continued)

(52) U.S. Cl.
CPC ............. *C01B 3/047* (2013.01); *B01J 12/007* (2013.01); *B01J 16/005* (2013.01);
(Continued)

(58) Field of Classification Search
CPC ............. C01B 3/04; C01B 2203/1058; C01B 2203/066; C01B 2203/0277; C01B 3/047; C01B 2203/1082; B01J 2219/0875; B01J 12/007; B01J 19/249; B01J 2219/2458; B01J 2219/2459; B01J 2219/246;
(Continued)

(56) References Cited

U.S. PATENT DOCUMENTS 4,467,050 A 8/1984 Patel et al.
5,055,282 A 10/1991 Shikada et al.
(Continued)

FOREIGN PATENT DOCUMENTS

JP H02198639 A 8/1990
JP 2004195454 A 7/2004
(Continued)

*Primary Examiner* — Timothy C Vanoy
(74) *Attorney, Agent, or Firm* — Abel Schillinger, LLP

(57) ABSTRACT

Disclosed is a process for the catalytic thermal decomposition of ammonia into hydrogen and nitrogen by contacting ammonia at a temperature of at least 500° C. with a porous ceramic layer which comprises nickel. Also disclosed is a reactor for carrying out the process.

20 Claims, 2 Drawing Sheets

(51) Int. Cl.
*B01J 19/00* (2006.01)
*H01M 8/0606* (2016.01)
*B01J 12/00* (2006.01)
*B01J 19/24* (2006.01)

(52) U.S. Cl.
CPC ......... *B01J 19/0053* (2013.01); *B01J 19/249* (2013.01); *C01B 3/04* (2013.01); *H01M 8/0606* (2013.01); B01J 2219/00051 (2013.01); B01J 2219/0218 (2013.01); B01J 2219/0286 (2013.01); B01J 2219/0875 (2013.01); B01J 2219/246 (2013.01); B01J 2219/2453 (2013.01); B01J 2219/2458 (2013.01); B01J 2219/2459 (2013.01); B01J 2219/2465 (2013.01); B01J 2219/2479 (2013.01); B01J 2219/2487 (2013.01); B01J 2219/2497 (2013.01); C01B 2203/0277 (2013.01); C01B 2203/066 (2013.01); C01B 2203/1058 (2013.01); C01B 2203/1082 (2013.01); Y02E 60/364 (2013.01)

(58) Field of Classification Search
CPC ........ B01J 2219/2465; B01J 2219/2479; B01J 2219/2487; B01J 2219/2497; B01J 16/005; B01J 2219/0286; B01J 2219/0218; B01J 2219/00051; B01J 19/0053; Y02E 60/364; H01M 8/0606
See application file for complete search history.

(56) References Cited

U.S. PATENT DOCUMENTS

| 5,652,020 | A | * | 7/1997 | Collins ................. B01D 53/22 210/500.25 |
|---|---|---|---|---|
| 5,976,723 | A | | 11/1999 | Boffito et al. |
| 5,980,843 | A | | 11/1999 | Silversand |
| 6,936,363 | B2 | | 8/2005 | Kordesch et al. |
| 2004/0154223 | A1 | | 8/2004 | Powell et al. |
| 2005/0037244 | A1 | | 2/2005 | Goetsch et al. |
| 2008/0145554 | A1 | | 6/2008 | Ghasripoor et al. |
| 2009/0060809 | A1 | | 3/2009 | Shioya et al. |
| 2010/0055516 | A1 | | 3/2010 | Mason et al. |
| 2011/0008694 | A1 | | 1/2011 | Tange et al. |
| 2011/0176988 | A1 | | 7/2011 | Okamura et al. |
| 2018/0015443 | A1 | | 1/2018 | Finkelshtain et al. |

FOREIGN PATENT DOCUMENTS

| WO | 2006113451 | A2 | 10/2006 |
|---|---|---|---|
| WO | 2008050129 | A2 | 5/2008 |
| WO | 2016126576 | A1 | 8/2016 |

* cited by examiner

PROCESS FOR THE THERMAL DECOMPOSITION OF AMMONIA AND REACTOR FOR CARRYING OUT SAID PROCESS

CROSS-REFERENCE TO RELATED APPLICATIONS

The present application claims priority of U.S. Provisional Patent Application No. 62/195,516, filed Jul. 22, 2015, the entire disclosure of which is expressly incorporated by reference herein.

BACKGROUND OF THE INVENTION

1. Field of the Invention

The present invention relates to a process for the nickel-catalyzed thermal decomposition of ammonia and a reactor for carrying out said process. The process allows the efficient decomposition of ammonia at relatively low temperatures, e.g., temperatures of 600° C. and below.

2. Discussion of Background Information

One of the environmentally most benign ways of generating energy is the use of hydrogen as fuel, for example in a fuel cell. The only combustion product of a fuel cell, i.e., water apparently does not pose any risks to the environment. However, the main challenge of this technology is provide the hydrogen fuel in an efficient manner. There is a need to contain a useful quantity of hydrogen in a small volume. Such containment requires either refrigerating the hydrogen until it achieves the liquid state or compressing it to 5,000 psi. Both processes involve considerable expense. Further, the small hydrogen molecules can leak through holes and cracks too small for other molecules and they can diffuse into the crystalline structure of metals and thereby embrittle them. Accordingly, the main obstacle to using hydrogen fuel cells lies in the requirement to store enough hydrogen in an efficient way to make the cell practical.

One approach to overcome the drawbacks of using hydrogen as a fuel is to generate it from a compound that is easier to store and transport than hydrogen in a separate reactor which can be connected to the fuel cell. Ammonia is such a compound. As a fuel ammonia has several advantages over hydrogen and hydrocarbon fuels. For example, ammonia is a common industrial chemical and is used, for example, as the basis for many fertilizers. Producers also transport it and contain it in tanks under modest pressure, in a manner similar to the containment and transport of propane. Thus there already is a mature technology in place for producing, transporting and storing ammonia. Further, although ammonia has some toxicity when inhaled, ammonia inhalation can easily be avoided because it has a readily detected odor. Ammonia also does not readily catch fire, as it has an ignition temperature of 650° C. If no parts of an ammonia-based power system reach that temperature, then any ammonia spilled in an accident will simply dissipate.

Hydrogen can be generated from the ammonia in an endothermic reaction carried out in a device separate from the fuel cell. Ammonia decomposition reactors (ammonia crackers) catalytically decompose ammonia into hydrogen and nitrogen. However, this reaction requires high temperatures, in certain cases up to 1000° Celsius.

U.S. Pat. Nos. 5,055,282 and 5,976,723, the entire disclosures of which are incorporated by reference herein, disclose a method for cracking ammonia into hydrogen and nitrogen in a decomposition reactor. The method consists of exposing ammonia to a suitable cracking catalyst under conditions effective to produce nitrogen and hydrogen. In this case the cracking catalyst consists of an alloy of zirconium, titanium, and aluminum doped with two elements from the group consisting of chromium, manganese, iron, cobalt, and nickel.

U.S. Pat. No. 6,936,363, the entire disclosure of which is incorporated by reference herein, discloses a method for the production of hydrogen from ammonia based on the catalytic dissociation of gaseous ammonia in a cracker at 500-750° C. A catalytic fixed bed is used; the catalyst is Ni, Ru and Pt on $Al_2O_3$. The ammonia cracker supplies a fuel cell (for example, an alkaline fuel cell (AFC)) with a mixture of hydrogen and nitrogen. Part of the supplied hydrogen is burned in the ammonia cracker for the supply of the energy needed for the ammonia dissociation process.

Despite advances in the art, there still is a need for a process that uses only an inexpensive catalyst (i.e., a catalyst not requiring and preferably being substantially free of expensive metals) that can decompose ammonia in an efficient way over a wide range of temperatures, including at a relatively low temperature.

SUMMARY OF THE INVENTION

The present invention provides a process for the catalytic thermal decomposition of ammonia into hydrogen and nitrogen. The process comprises contacting ammonia at a temperature of at least 500° C. with a porous ceramic layer which comprises nickel.

In one aspect of the process, the porous ceramic layer may be present on a metal surface, for example a steel or stainless steel surface. In particular, the layer will preferably be present on a metal sheet, a metal plate and/or a metal mesh.

In another aspect, the porous ceramic layer may have a thickness of from 0.1 mm to 1 mm, for example, from 0.2 mm to 0.5 mm.

In yet another aspect, the porous ceramic layer may comprise alumina, zirconia, titanium dioxide, magnesium oxide, calcium oxide, silica, tungsten carbide, silicon nitride or combinations of two or more thereof. For example, the ceramic layer may comprise (at least) alumina. In another aspect, the layer may (also) comprise calcium aluminate.

In a still further aspect of the process of the present invention, the porous ceramic layer may have been formed by thermal spraying and/or may have been formed by a method selected from flame spraying, air plasma spraying, high velocity spraying, detonation spraying, warm spraying, cold spraying, corona brushing, protective gas plasma spraying, vacuum plasma spraying, or a laser based process for surface coating. For example, the porous ceramic layer may have been formed by starting from a mixture comprising a ceramic material and a combustible pore forming substance. The combustible pore forming substance may be selected from, for example, graphite, vegetable materials, organic polymers and combinations of two or more of these materials.

In another aspect of the process, the porous ceramic layer may be substantially free of Rh, Ir, Ru, Pd, Pt and/or may comprise at least 10% by weight of nickel, calculated as nickel oxide, based on the total weight of the ceramic layer and/or may comprise nickel oxide in partially or completely reduced form. The nickel oxide may have been reduced by hydrogen and/or ammonia.

In another aspect, the process may be carried out at a temperature of not higher than 600° C., e.g., not higher than 575° C.

In another aspect of the process, at least 99.8% by volume, e.g., at least 99.85% by volume of ammonia may be decomposed.

The present invention also provides a reactor for the thermal decomposition of ammonia (e.g., a reactor for carrying out the process of the present invention as set forth above (including the various aspects thereof)). The reactor comprises at least one metal structure which carries a porous ceramic layer that comprises nickel.

In one aspect of the reactor, the metal structure may be selected from a sheet, a plate, a mesh or any combination thereof. In another aspect, the reactor may comprise a plurality of metal structures (e.g., from 2 to 100 metal structures) carrying a porous ceramic layer.

In another aspect, the reactor may be connected to a hydrogen fuel cell (e.g., an alkaline fuel cell) in a way which allows hydrogen produced in the reactor to be used as fuel for the fuel cell.

In yet another aspect, the reactor may further comprise at least one heating element for ammonia that is introduced into the reactor. For example, the at least one heating element may comprise a catalyst for combusting a fuel, which fuel may, for example, be a gaseous hydrocarbon and/or hydrogen. The catalyst may comprise a transition metal and/or the at least one heating element may comprise a metal plate and/or a metal sheet and/or a metal mesh that is coated with the catalyst.

The present invention also provides a process for the catalytic thermal decomposition of ammonia into hydrogen and nitrogen, which process comprises introducing ammonia into the reactor of the present invention as set forth above (including the various aspects thereof).

In one aspect, the process may be carried out at a temperature of the ammonia to be decomposed of not higher than 600° C., e.g., not higher than 575° C.

In another aspect, a gas mixture leaving the reactor may comprise not more than 0.2% by volume, e.g., not more than 0.15% by volume, of ammonia (for example, at a gas hourly space velocity of hydrogen plus nitrogen of 2,000 h$^{-1}$).

The present invention also provides a method of operating a hydrogen fuel cell (e.g., an alkaline fuel cell). The method comprises using as at least a part of the fuel the hydrogen that has been obtained by one of the processes of the present invention as set forth above (including the various aspects thereof).

BRIEF DESCRIPTION OF THE DRAWINGS

The present invention is further described in the detailed description which follows, in reference to the accompanying drawings by way of non-limiting examples of exemplary embodiments of the present invention. In the drawings.

DETAILED DESCRIPTION OF THE PRESENT INVENTION

Figure 1:
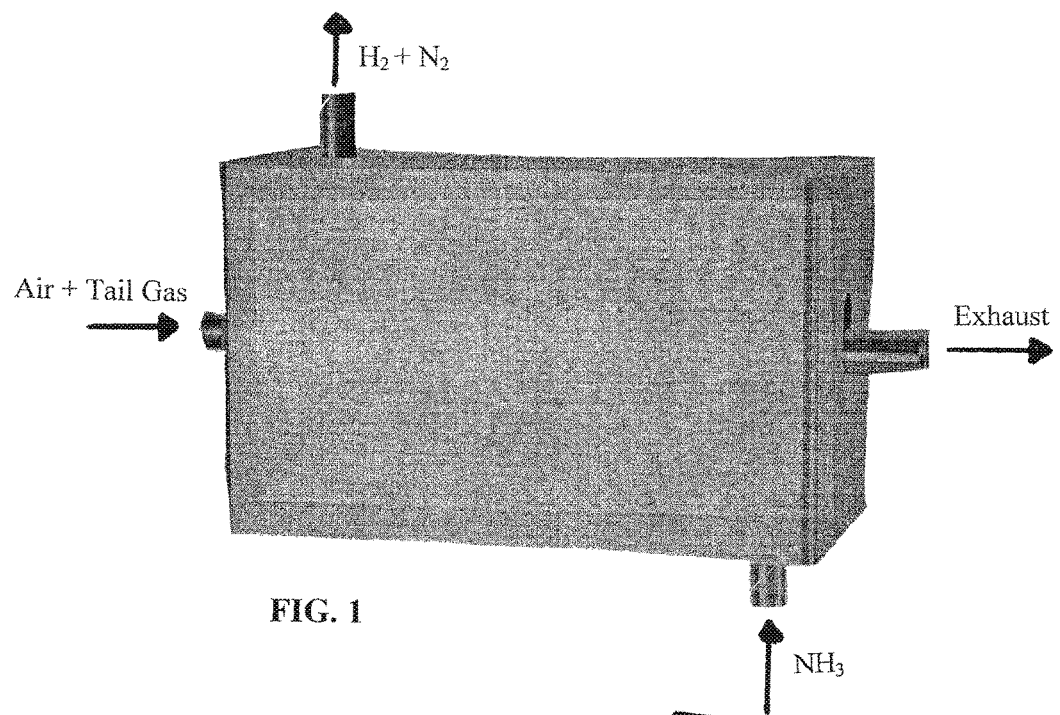
FIG. 1 schematically shows a reactor for thermally decomposing ammonia according to the present invention from the outside.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

As used herein, the singular forms "a," "an," and "the" include the plural reference unless the context clearly dictates otherwise. For example, reference to "a ceramic material" would also mean that mixtures of two or more ceramic materials can be present unless specifically excluded.

Except where otherwise indicated, all numbers expressing quantities of ingredients, reaction conditions, etc. used in the instant specification and appended claims are to be understood as being modified in all instances by the term "about." Accordingly, unless indicated to the contrary, the numerical parameters set forth in the present specification and the appended claims are approximations that may vary depending upon the desired properties sought to be obtained by the present invention. At the very least, each numerical parameter should be construed in light of the number of significant digits and ordinary rounding conventions.

Additionally, the disclosure of numerical ranges within this specification is considered to be a disclosure of all numerical values and ranges within that range. For example, if a range is from 1 to 50, it is deemed to include, for example, 1, 7, 34, 46.1, 23.7, or any other value or range within the range.

The process of the present invention comprises contacting ammonia at a temperature of at least 500° C. (e.g., at least 525° C., at least 550° C., or at least 575° C., but preferably not higher than 650° C., e.g., not higher than 625° C., or not higher than 600° C.) with a porous ceramic layer that comprises nickel. The porous ceramic layer will usually be present in the form of a (thin) coating on the surface of a metal structure such as a metal plate, a metal sheet or a metal mesh (in the case of a mesh the individual wires of the mesh will be coated). A ceramic layer may be present on one or both major surfaces of the structure, but usually only on one surface thereof.

A suitable metal (the term "metal" as used herein includes metal alloys) preferably is a metal that is relatively inexpensive while being able to withstand the high temperatures used in the process of the invention under corrosive conditions. The metal may, for example, be an alloy such as steel or stainless steel. The thickness of the metal structure can vary within a wide range, but will often be from 1 mm to 10 mm, e.g., from 2 mm to 7 mm. Merely by way of example, the major dimensions of a metal structure that is present as an approximately rectangular sheet, plate or mesh may, for example be about 40 cm×20 cm, but may also be considerably larger (e.g., by a factor of 4 or more) or considerably smaller. Of course, the metal structure is not limited to a rectangular shape but can have any shape that is suitable for the intended purpose (e.g., triangular, circular, oval, trapezoid, etc.).

The porous ceramic layer which is usually present in the form of a coating on a metal structure will often have a thickness of at least 0.1 mm, e.g., at least 0.2 mm, or at least 0.3 mm, but usually not higher than 1 mm, e.g., not higher than 0.7 mm, or not higher than 0.5 mm.

The porous ceramic layer may comprise one or more of alumina, zirconia, titanium dioxide, magnesium oxide, calcium oxide, silica, tungsten carbide, silicon nitride or combinations of two or more thereof. In a preferred embodiment the ceramic layer comprises alumina, optionally in combination with other ceramic materials such as, e.g., calcium aluminate.

The porous ceramic layer will usually be formed on a substrate (e.g., metal) surface by thermal spraying of a powder of a ceramic material that includes a nickel compound such as nickel oxide. Nickel-based catalysts for the thermal decomposition of ammonia are commercially available, admixed with ceramic material, but usually only in bead or pellet form and the like. If such a commercially available catalyst is to be used, the powder can be produced from the commercial product by comminuting (e.g. grinding) it.

Alternatively or additionally, nickel may be incorporated in the porous ceramic layer after the layer has been formed, as discussed in more detail below. The thermal spraying can be carried out by any suitable method such as, e.g., flame spraying, air plasma spraying, high velocity spraying, detonation spraying, warm spraying, cold spraying, corona brushing, protective gas plasma spraying, or vacuum plasma spraying. In order to create pores in the ceramic layer or coating a mixture comprising a ceramic material and a combustible pore forming substance will usually be employed as powder to be subjected to thermal spraying. Suitable combustible pore forming substances include, for example, graphite, vegetable materials, and organic polymers such as, e.g., polyamides. Upon combusting and thereby forming gaseous substances, the combustible materials leave behind voids (pores) in the ceramic layer.

The surface area of a porous ceramic layer can be further increased by depositing a high surface area ceramic material, such as, e.g., alumina, silica, titanium dioxide, zirconia, aluminum-titanium, silicon carbide and mixtures thereof, in the pores of the ceramic layer by an in-situ precipitation technique, or a sol-gel technique or by injecting the high surface area ceramic material into the jet spray of the ceramic material during the thermal spraying process so that both high surface area ceramic and ceramic material are deposited onto the substrate.

(Additional) nickel can be incorporated into a corresponding porous layer by contacting (e.g., impregnating) the layer with an (aqueous) solution of a nickel compound such as nickel chloride or nickel sulfate (e.g., by immersion into a corresponding solution) and thereafter precipitating nickel hydroxide by adding a base to the solution, followed by drying and heating the thus impregnated layer in a reducing or oxidizing atmosphere. For a more detailed discussion of corresponding techniques U.S. Pat. No. 5,980,843, the entire disclosure of which is incorporated by reference herein, may be referred to.

One of ordinary skill in the art will be aware that in order to be able to effectively catalyze the thermal decomposition of ammonia the catalyst of the present invention has to be reduced at least partially. Ammonia and/or hydrogen gas may, for example, be used for this purpose. If the catalyst is initially used in only partially reduced form it will be reduced completely by the ammonia with which it is contacted at elevated temperature and also by the hydrogen gas that is generated due to the decomposition of ammonia.

The porous ceramic layer may comprise one or more additional materials which are able to catalyze the thermal decomposition of ammonia, but will usually be substantially free of corresponding materials. In particular, the layer will usually contain not more than trace amounts, if any, of noble metals and other expensive (transition) metals such as Rh, Ir, Pd, Pt, etc. If any other transition metals are present at all, their total concentration will usually be lower than the concentration of nickel by a factor of at least 2, e.g., by a factor of at least 3, at least 5, or at least 10. The concentration of nickel in the porous ceramic layer will often be at least 5% by weight, e.g., at least 10% by weight, at least 15% by weight, at least 20% by weight, or at least 25% by weight, but usually not higher than 45% by weight, e.g., not higher than 40% by weight, or not higher than 35% by weight, in each case calculated as nickel oxide and relative to the total weight of the ceramic layer.

The process for the thermal decomposition of ammonia into hydrogen and nitrogen according to the present invention comprises contacting heated gaseous ammonia with a nickel containing porous ceramic material (usually at atmospheric pressure, although lower and higher pressures may also be employed). This process can advantageously be carried out at relatively low temperature, even if the degree of ammonia decomposition needs to be high (e.g., at least 99.8% by volume of ammonia decomposed). The produced mixture of hydrogen and nitrogen may usually be employed without any further purification in a hydrogen-based fuel cell (e.g., an alkaline fuel cell).

The reactor for the thermal decomposition of ammonia according to the present invention comprises at least one metal structure such as a plate, sheet or mesh which carries a porous ceramic layer that comprises nickel, as described above. The number of metal structures (usually arranged in parallel) comprised in the reactor depends on factors such as, e.g., the desired ammonia decomposition capacity, the dimensions of an individual metal structure, the nickel loading and the porosity and thickness of the ceramic layer. In many cases, the number of metal structures will be at least 5, e.g., at least 10, at least 15 or at least 20, but usually not higher than 100, e.g., not higher than 80, not higher than 60, or not higher than 40.

The reactor will usually further comprise at least one heating element for heating the ammonia that is introduced into the reactor. For example, the at least one heating element may comprise a catalyst for combusting a fuel. The fuel may, for example, be a gaseous hydrocarbon such as methane, ethane, propane, butane and mixtures thereof and/or may be hydrogen (e.g., a part of the hydrogen that has been generated by the decomposition of ammonia inside the reactor). The catalyst may comprise a transition metal and/or the at least one heating element may comprise a metal plate and/or a metal sheet and/or a metal mesh that is coated with the catalyst. The dimensions of a metal structure that is used for heating may be the same or similar to the dimensions of the metal structure that is used for catalyzing the decomposition of ammonia. The number of heating elements inside the reactor will often be the same or similar to the number of metal structures which carry the porous ceramic coating.

One of the advantages of the present reactor is that the pressure drop inside the reactor is minimal since the ammonia is passed over a catalyst instead of being passed through a catalyst. The reactor of the present invention is capable of providing a mixture of hydrogen and nitrogen (in a molar ratio of 3:1), which mixture contains only very small amounts of ammonia (e.g., not more than 0.2% by volume) and is thus suitable for providing hydrogen to any apparatus that uses hydrogen (diluted with nitrogen) as fuel, such as a hydrogen-based fuel cell (e.g., an alkaline fuel cell). A corresponding fuel cell may, for example, be used as replacement for a conventional source of electrical energy such as a fuel-based generator or may provide energy for a car. In other words, the present invention also provides a process for the generation of electricity that comprises using a hydrogen-based fuel cell such as an alkaline fuel cell that is connected to a reactor which contains a Ni-based catalyst of the present invention as set forth above.

The process and reactor of the present invention will in the following be described by means of non-limiting embodiments thereof.

Figure 2:
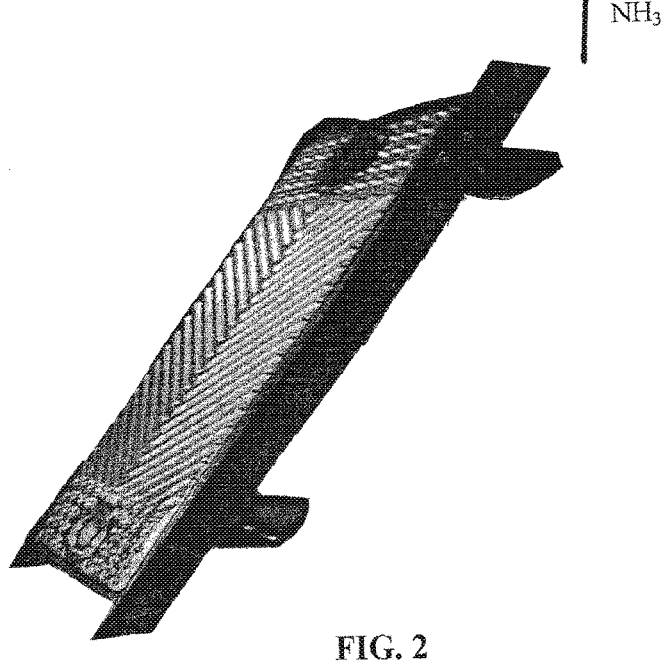
FIG. 2 schematically shows a metal plate for use in the reactor of FIG. 1.
Figure 3:
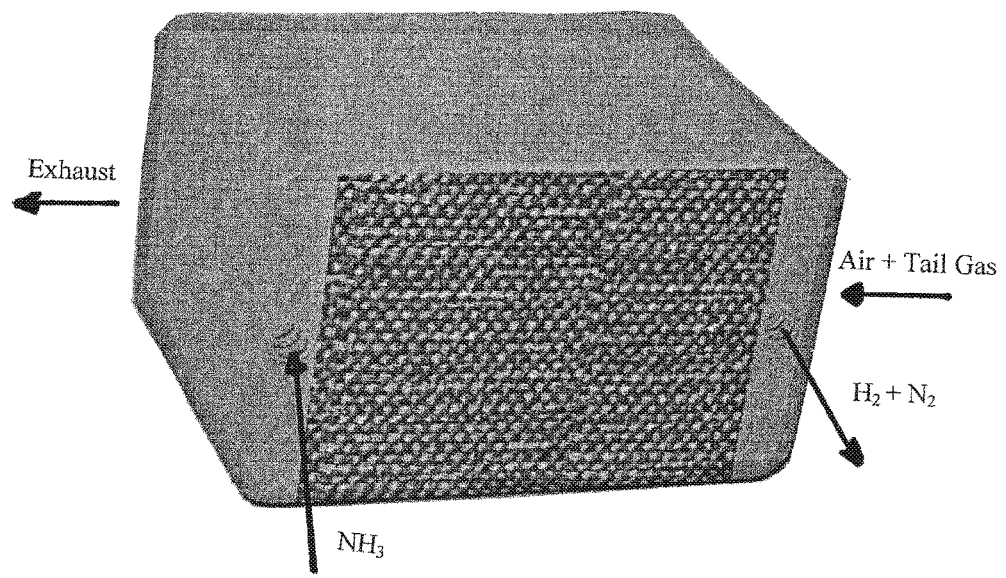
FIG. 3 schematically shows the reactor of FIG. 1 with the housing removed.

FIG. 1 schematically shows a cracking reactor according to the present invention. The reactor is constructed from a number of pressed plates (e.g., 20 to 80 plates) such as the one shown in FIG. 2, which plates are stacked into a heat exchanger reactor. Each plate (dimension about 350×200×4 mm) is coated with a catalyst, combustion catalyst or cracking catalyst, respectively. In addition, the plates are designed so that additional wire-mesh catalyst for ammonia cracking can be installed between the plates. The plate package is open from the combustion side and the whole package (e.g., 40 plates in total) is inserted into a housing with appropriate connections. FIG. 3 shows the stack of plates without housing. In addition, one plate has been removed to show the additional wire-mesh catalysts which may be sandwiched between the plates. Pre-heated ammonia and air/fuel are supplied to the reactor inlets. Hydrogen is combusted on the combustion catalyst and supplies the endothermic cracking reaction with sufficient heat. The flow pattern in the reactor is counter current to facilitate a high outlet temperature of the product gas, resulting in high reaction rates and low equilibrium concentrations of ammonia.

The reactor features a close coupling between heat transfer and reaction kinetics in a compact structure. The temperature gradients in the catalyst can be reduced to a minimum in this reactor, which means that the utilization of the catalyst can be optimized.

The ammonia to be introduced in the cracking reactor may be preheated in a heat exchanger by the heat from the hot product gases (hydrogen, nitrogen) leaving the reactor. This heat exchange at the same time cools the product gases to make their temperature suitable for being introduced into an alkaline fuel cell. The tail gas leaving the fuel cell may in turn be used to heat the cracking reactor by combustion (with possible addition of some product gas from the reactor). The air/tail gas mixture may be recuperated with the combustion gases leaving the heat-exchanger reactor.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

To sum up, the present invention provides the following:
1. A process for the catalytic thermal decomposition of ammonia into hydrogen and nitrogen, which process comprises contacting ammonia at a temperature of at least 500° C. with a porous ceramic layer which comprises nickel.
2. The process of item 1, wherein the porous ceramic layer is present on a metal surface.
3. The process of item 2, wherein the metal surface is a steel surface.
4. The process of any one of items 2 and 3, wherein the layer is present on a metal sheet, a metal plate and/or a metal mesh.
5. The process of any one of items 2 to 4, wherein the layer has a thickness of from 0.1 mm to 1 mm.
6. The process of any one of items 2 to 5, wherein the layer has a thickness of from 0.2 mm to 0.5 mm.
7. The process of any one of items 1 to 6, wherein the porous ceramic layer comprises one or more of alumina, zirconia, titanium dioxide, magnesium oxide, calcium oxide, silica, tungsten carbide, silicon nitride.
8. The process of any one of items 1 to 7, wherein the porous ceramic layer comprises alumina.
9. The process of any one of items 1 to 8, wherein the porous ceramic layer comprises calcium aluminate.
10. The process of any one of items 2 to 9, wherein the porous ceramic layer has been formed by thermal spraying.
11. The process of any one of items 2 to 10, wherein the porous ceramic layer has been formed by a method selected from flame spraying, air plasma spraying, high velocity spraying, detonation spraying, warm spraying, cold spraying, corona brushing, protective gas plasma spraying, vacuum plasma spraying, or a laser based process for surface coating.
12. The process of item 11, wherein the porous ceramic layer has been formed starting from a mixture comprising a ceramic material and a combustible pore forming substance.
13. The process of item 12, wherein the combustible pore forming substance is selected from one or more of graphite, vegetable materials, organic polymers.
14. The process of any one of items 1 to 13, wherein the porous ceramic material is substantially free of Rh, Ir, Ru, Pd, Pt.
15. The process of any one of items 1 to 14, wherein the porous ceramic material comprises at least 10% by weight of nickel, calculated as nickel oxide.
16. The process of any one of items 1 to 15, wherein the porous ceramic material comprises nickel oxide in partially or completely reduced form.
17. The process of claim 16, wherein the nickel oxide has been reduced by at least one of hydrogen and ammonia.
18. The process of any one of items 1 to 17, wherein the process is carried out at a temperature of not higher than 600° C.
19. The process of item 18, wherein the process is carried out at a temperature of not higher than 575° C.
20. The process of any one of items 1 to 19, wherein at least 99.8% by volume of ammonia are decomposed.
21. The process of any one of items 1 to 20, wherein at least 99.85% by volume of ammonia are decomposed.
22. A reactor for the thermal decomposition of ammonia, wherein the reactor comprises at least one metal structure which carries a porous ceramic layer that comprises nickel.
23. The reactor of item 22, wherein the metal structure is selected from a sheet, a plate, and a mesh.
24. The reactor of any one of items 22 and 23, wherein the reactor comprises a plurality of metal structures carrying a porous ceramic layer.

25. The reactor of any one of items 22 to 24, wherein the reactor is connected to a hydrogen fuel cell in a way which allows hydrogen produced in the reactor to be used as fuel for the fuel cell.

26. The reactor of any one of items 22 to 25, wherein the reactor further comprises at least one heating element for ammonia that is introduced into the reactor.

27. The reactor of item 26, wherein the at least one heating element comprises a catalyst for combusting a fuel.

28. The reactor of item 27, wherein the fuel comprises at least one of a gaseous hydrocarbon and hydrogen.

29. The reactor of any one of items 27 and 28, wherein the catalyst for combusting a fuel comprises a transition metal.

30. The reactor of any of items 26 to 29, wherein the at least one heating element comprises at least one of a metal plate, a metal sheet or a metal mesh that is coated with the catalyst.

31. A process for the catalytic thermal decomposition of ammonia into hydrogen and nitrogen, which process comprises introducing ammonia into the reactor of any one of items 22 to 30.

32. The process item 31, wherein the process is carried out at a temperature of not higher than 600° C.

33. The process of item 32, wherein the process is carried out at a temperature of not higher than 575° C.

34. The process of any one of items 31 to 33, wherein a gas mixture leaving the reactor comprises not more than 0.2% by volume of ammonia.

35. A method of operating a hydrogen fuel cell, wherein the method comprises using as at least a part of the hydrogen fuel the hydrogen obtained by the process of any one of items 1 to 21 and 31 to 34.

What is claimed is:

1. A process for the catalytic thermal decomposition of ammonia into hydrogen and nitrogen, wherein the process comprises contacting ammonia at a temperature of at least 500° C. with a porous ceramic layer which comprises nickel and has a thickness of from 0.1 mm to 1 mm.

2. The process of claim 1, wherein the porous ceramic layer is present on a metal surface.

3. The process of claim 2, wherein the porous ceramic layer is present on a metal sheet, a metal plate and/or a metal mesh.

4. The process of claim 2, wherein the porous ceramic layer has a thickness of from 0.2 mm to 0.5 mm.

5. The process of claim 1, wherein the porous ceramic layer comprises one or more of alumina, zirconia, titanium dioxide, magnesium oxide, calcium oxide, silica, tungsten carbide, silicon nitride.

6. The process of claim 1, wherein the porous ceramic layer comprises at least 5% by weight of nickel, calculated as nickel oxide.

7. The process of claim 1, wherein the nickel in the porous ceramic layer is present in at least partially reduced form.

8. The process of claim 1, wherein the porous ceramic layer has been formed by thermal spraying starting from a mixture comprising a ceramic material and a combustible pore forming substance.

9. The process of claim 1, wherein the porous ceramic layer has been formed by thermal spraying starting from a powder of a ceramic material which includes a nickel compound.

10. A process for the catalytic thermal decomposition of ammonia into hydrogen and nitrogen, wherein the process comprises contacting ammonia at a temperature of at least 500° C. with a porous ceramic layer which comprises nickel and has been formed by thermal spraying starting from a mixture comprising a ceramic material and a combustible pore forming substance.

11. The process of claim 10, wherein the combustible pore forming substance is selected from one or more of graphite, vegetable materials, organic polymers.

12. The process of claim 10, wherein the mixture further comprises a nickel compound.

13. The process of claim 10, wherein the porous ceramic layer is present on a metal sheet, a metal plate and/or a metal mesh.

14. The process of claim 10, wherein the nickel in the porous ceramic layer is present in at least partially reduced form.

15. A process for the catalytic thermal decomposition of ammonia into hydrogen and nitrogen, wherein the process comprises contacting ammonia at a temperature of at least 500° C. with a porous ceramic layer which comprises nickel and has been formed by thermal spraying of a powder of a ceramic material which includes a nickel compound.

16. The process of claim 15, wherein the nickel compound comprises nickel oxide.

17. The process of claim 15, wherein the nickel in the porous ceramic layer is present in at least partially reduced form.

18. A reactor for the thermal decomposition of ammonia, wherein the reactor is suitable for carrying out the process of claim 1 and comprises at least one porous ceramic layer which comprises nickel and has a thickness of from 0.1 mm to 1 mm.

19. A reactor for the thermal decomposition of ammonia, wherein the reactor is suitable for carrying out the process of claim 10 and comprises at least one porous ceramic layer which comprises nickel and has been formed by thermal spraying starting from a mixture comprising a ceramic material and a combustible pore forming substance.

20. A reactor for the thermal decomposition of ammonia, wherein the reactor is suitable for carrying out the process of claim 15 and comprises at least one porous ceramic layer which comprises nickel and has been formed by thermal spraying of a powder of a ceramic material which includes a nickel compound.

* * * * *